(12) United States Patent
Ji et al.

(10) Patent No.: US 9,854,598 B2
(45) Date of Patent: *Dec. 26, 2017

(54) METHOD AND APPARATUS FOR SCHEDULING COMMUNICATION TRAFFIC FLOWS

(71) Applicant: AT&T INTELLECTUAL PROPERTY I, L.P., Atlanta, GA (US)

(72) Inventors: Lusheng Ji, Randolph, NJ (US); Bo Han, Bridgewater, NJ (US); Robert Raymond Miller, II, Convent Station, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/283,521

(22) Filed: Oct. 3, 2016

(65) Prior Publication Data

US 2017/0026986 A1  Jan. 26, 2017

Related U.S. Application Data

(63) Continuation of application No. 14/464,457, filed on Aug. 20, 2014, now Pat. No. 9,480,079, which is a continuation of application No. 12/341,557, filed on Dec. 22, 2008, now Pat. No. 8,848,719.

(51) Int. Cl.
*H04W 72/12* (2009.01)
*H04L 5/00* (2006.01)
*H04W 84/12* (2009.01)

(52) U.S. Cl.
CPC ....... *H04W 72/1236* (2013.01); *H04L 5/0082* (2013.01); *H04W 72/1242* (2013.01); *H04W 72/1257* (2013.01); *H04W 84/12* (2013.01)

(58) Field of Classification Search
CPC .......... H04W 72/123; H04W 72/1257; H04W 72/1242; H04L 5/0082
See application file for complete search history.

(56) References Cited

U.S. PATENT DOCUMENTS

2002/0120661 A1  8/2002  Binns et al.
2005/0009578 A1  1/2005  Liu
2007/0097867 A1  5/2007  Kneckt et al.

*Primary Examiner* — Jackie Zuniga Abad
(74) *Attorney, Agent, or Firm* — Guntin & Gust, PLC; Ralph Trementozzi (57) ABSTRACT

In one or more embodiments of the disclosed technology, an Access Point (AP) schedules communication traffic flows or service tasks between an Access Point (AP) and one or more member stations in a Wireless Local Area Network (WLAN). The communication traffic flows or service tasks may include both control and management flows and data traffic flows. The communication traffic flows or service tasks may include traffic flows or streams of different types, each of which may have different service intervals. The order of service tasks can be changed from cycle to cycle, randomly, by rotation, or based on historical delay records.

20 Claims, 7 Drawing Sheets

METHOD AND APPARATUS FOR SCHEDULING COMMUNICATION TRAFFIC FLOWS

CROSS-REFERENCE TO RELATED APPLICATIONS

This application is a continuation of U.S. application Ser. No. 14/464,457, filed Aug. 20, 2014, which is a continuation of U.S. application Ser. No. 12/341,557, filed Dec. 22, 2008 (now U.S. Pat. No. 8,848,719), which are incorporated herein by reference in their entirety.

FIELD OF THE DISCLOSURE

The disclosed technology relates generally to Wireless Local Area Networks (WLANs) and more particularly to scheduling service tasks in a Wireless Local Area Network.

BACKGROUND OF THE DISCLOSURE

In a Wireless Local Area Network (WLAN) an Access Point (AP) can communicate with a plurality of member stations over a wireless communications channel. Each member station may be, for example, a cellular telephone, a portable computer, or any other wireless receiver and/or transmitter unit.

Generally, each of a plurality of member stations of a Basic Service Set (BSS) in a Wireless Local Area Network (WLAN) communicates with other stations and with an Access Point (AP) of the same BSS using either a scheduled access approach or a contention based access approach. In a scheduled access approach each member station is polled in a round robin fashion by the AP to allow that member station to transmit while other member stations cannot. In a contention based approach each member station checks a communications channel to see if it is busy. If the communications channel is not busy the member station attempts to transmit. If the communications channel is busy, the member station defers its transmission for a period of time, which typically includes an Arbitration Inter-Frame Space (AIFS) followed by a Contention Window (CW). If the communications channel is not busy for the entire deferral period, the member station then can begin its transmission.

Communications between an Access Point (AP) and a member station may include control and management signals, messages, or traffic flow, such as beacon signals, as well as data signals, messages, or traffic flow, such as Voice over Internet Protocol (VoIP) calls. Control and management signals are typically independent of, and may interfere with, data signals. Generally scheduling methods have only considered service cycles of admitted QoS data traffic flows because in systems such as cellular systems for which most scheduling methods have been developed, control and management signals are typically transmitted on a separate control channel instead of sharing the data channel with QoS data traffic. However, in WLAN systems, control and management signal transmissions share the same channel as data transmissions. Because control and management messages and signals are often not periodic, or even when they are periodic their service cycles are very different from QoS data service cycles, how to schedule both control and management traffic and QoS data traffic efficiently is not trivial in WLAN systems.

An AP controls and coordinates data transmissions of its member stations' QoS streams by using a service schedule, which schedules data transmissions for admitted QoS streams in a round robin and periodic fashion. Each scheduled transmission is referred to as a service task. The service cycle duration is referred to as schedule duration.

One method for scheduling QoS stream data transmission in WLAN systems involves reducing a beacon interval to the same as the minimum of all maximum service intervals of all admitted QoS data streams. The maximum service interval of a QoS data stream is normally determined as the maximum transition delay that the QoS data stream can tolerate. For instance, a VoIP (Voice Internet Protocol) data stream may have a packet generation interval of ten ms (milliseconds) and a maximum service interval of fifty ms. This means that even if a packet is delayed for fifty ms in transit, when it arrives at a final receiver end, the data within the packet is still usable. On the other hand, a reference scheduler proposed by the IEEE 802.11e-2005 document (Section K3.3.1) suggests building a simple schedule with Scheduled Service Interval (SSI) being a number that is both a submultiple of the beacon interval and less than the minimum of all maximum service intervals of all admitted streams.

Both of the above approaches are similar in the way that the schedule duration is based on the minimum of all maximum service intervals of all admitted streams. A common problem for both approaches is that the beacon transmissions are not handled efficiently. The first approach produces unnecessary beacon transmissions, which wastes valuable air time that can be used by data transmissions. Although the second approach does not produce unnecessary beacon transmissions, it still needs to leave a time slot within each SSI so that beacon transmissions can be accommodated, despite the fact that they only occur once every several SSI's. Because such a time slot is not available in every SSI, even when it is unoccupied by a beacon transmission it cannot be used by QoS stream data. At best it can be used by best-effort non QoS data. In other words, the second approach is still not efficient in terms of accommodating QoS stream data such as Voice over Internet Protocol (VoIP) data streams.

Generally, the order in which service tasks are executed does not change from cycle to cycle. A scheduler, such as an Access Point (AP) may rearrange service tasks when new service tasks are accepted and added to the schedule, or when existing service tasks or traffic flows are terminated and their corresponding service tasks are withdrawn from the schedule. These events are typically infrequent.

However, U.S. published patent application no. 2007/0097867, to Kneckt et. al. published on May 3, 2007, discloses techniques for providing a changed data transmission schedule. A first wireless station in a wireless network receives a first data transmission schedule. The first wireless station attempts to transmit data according to the first data transmission schedule. Subsequently, the first wireless station transmits a request for a schedule change, and receives a second data transmission schedule. In Knecket, an Access Point (AP) may provide changed data transmission schedules to one or more stations in order to relocate the data transmission or contention start times for one or more traffic streams in order to relieve congestion or prevent data collisions.

SUMMARY

A method of constructing a schedule of service tasks between an Access Point (AP) and one or more member stations in a Wireless Local Area Network (WLAN) is disclosed. Each service task is a transmission opportunity for a packet of a type of communications traffic flow. The communications traffic flow may include control traffic flow (which may include control messages or signals) and data traffic flow (which may include data messages or signals). The control traffic flow may include a beacon signal from the Access Point. The data traffic flow may include VoIP (Voice over Internet Protocol) data calls started by or terminated at a member station in the Wireless Local Area Network (WLAN). In one embodiment of the disclosed technology, data traffic flows of the same Quality of Service (QoS) may be rotated in the schedule randomly or in some other manner.

In one or more embodiments of the disclosed technology, control or management traffic is included in scheduling, along with data traffic, despite the fact that control traffic may not be periodic and may not require any Quality of Service (QoS) support.

DETAILED DESCRIPTION OF THE DRAWINGS

In one or more embodiments of the disclosed technology, an Access Point (AP) schedules service tasks between an Access Point (AP) and one or more member stations in a Wireless Local Area Network (WLAN). Each service task is a transmission opportunity for a packet of a type of communications traffic flow. The Access Point (AP) sets up a schedule of the service tasks which determines the sequential order in which the service tasks will be executed. The schedule or order of the service tasks may be stored in a computer memory of the Access Point (AP), and can be dynamically changed from one cycle or service duration (SD) to a subsequent cycle or service duration (SD).

Figure 1:
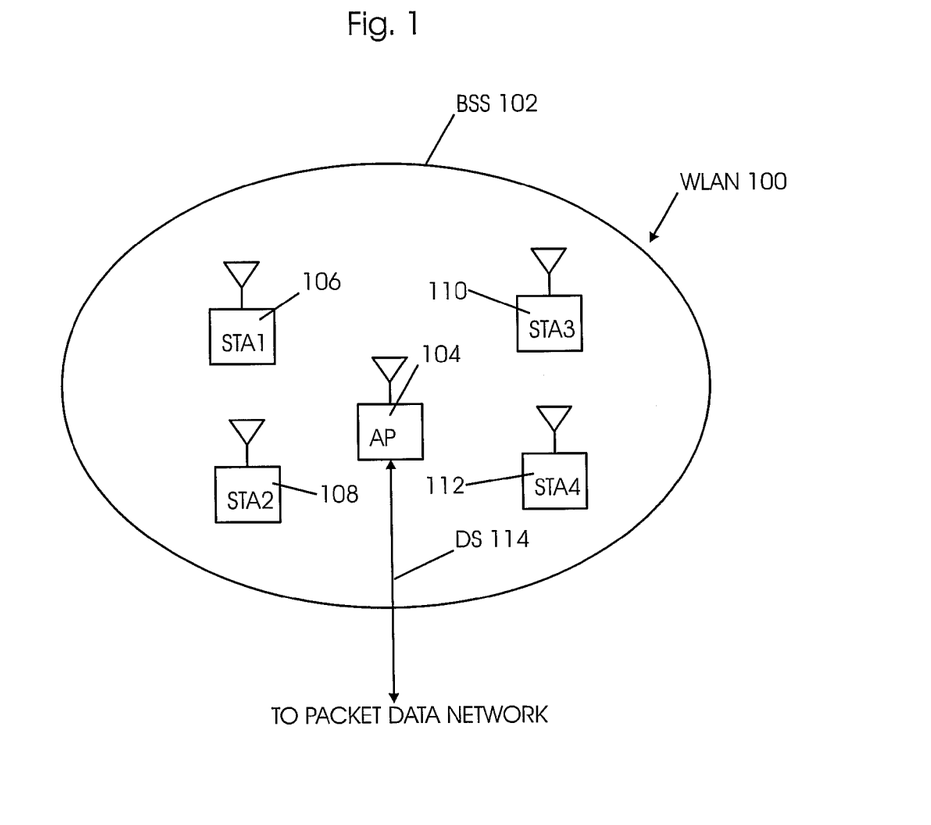
FIG. 1 shows a high-level schematic of a Wireless Local Area Network (WLAN) with a single Access Point (AP)

FIG. 1 shows a high-level schematic of a Wireless Local Area Network (WLAN) 100 with a single access point (AP) 104. The WLAN 100 further includes member stations STA1 106, STA2 108, STA3 110, and STA4 112. The member stations 106, 108, 110, and 112 are part of a Wireless Local Area Network cell called a Basic Service Set (BSS) 102. The access point (AP) 104 communicates with each of the member stations 106, 108, 110, and 112 over a wireless communications channel. The access point (AP) 104 communicates to a packet data network, details of which are not shown, through a distribution system DS 114.

Each member station communicates with the Access Point 104 via a scheduled access approach or a contention based access approach. In a scheduled based approach, during a certain time period after being polled, one member station can communicate over a communications channel with the Access Point 104, while the other member stations cannot. In a contention based approach, such as Carrier Sense Multiple Access-Collision Avoidance (CSMA-CA), a member station senses to see if a communications channel is available. If the channel is not available, the member station waits for a period of time called deferral period, and then tries again. If the channel is available after the waiting period of time, the particular member station communicates with the Access Point 104. Moreover, a WLAN system may use a hybrid approach of both a scheduled access approach and a contention based access approach called Channel Access Throttling or CAT. In such systems, the fundamental channel access mechanism is contention based. However an access schedule is imposed by an AP which dynamically adjusts the priorities of contention based channel accesses, or more precisely the lengths of the deferral periods, of member stations based on a pre-calculated schedule. During a time slot scheduled for a particular member station, the particular station is configured to have higher channel access priority, or shorter deferral period, than other member stations so that it has a higher probability of accessing the channel successfully. According to the schedule, member stations take turns to become this station with elevated channel access probability. Such a schedule must accommodate the QoS requirements of the QoS data traffic flows or streams within the BSS.

Generally, a beacon signal is a control and management signal, message, or traffic flow which is typically transmitted from an Access Point such as AP 104 to the member stations in its WLAN, such as to the member stations of WLAN 100. In WLAN systems, Access Points, such as AP 104, need to transmit a beacon message or signal periodically to announce the existence of the WLAN cell, such as including the Basic Service Set (BSS) 102 shown in FIG. 1, and to announce the communications parameters used by the current cell. The time that a beacon is supposed to be transmitted is called the Target Beacon Transmission Time or TBTT. TBTT's mark the boundaries of a WLAN operation coordination time unit, called Beacon Interval (BI). Beacon signals also synchronize the clocks of the members of a BSS, such as BSS 102 to the clock of the AP, such as Access Point 104. Beacon signals may not be transmitted at exactly TBTT because the AP, such as AP 104, may not be able to access a communications channel due to transmission by other members of the BSS, such as one of member stations STA1-4, 106, 108, 110, and 112 of BSS 102. Also beacon signals may not be of the same length because not all elements or components need to be present in every beacon signal or message. Certain components or elements, such as Delivery Traffic Indication Messages (DTIM), only appear every several beacon signals.

Figure 2A:
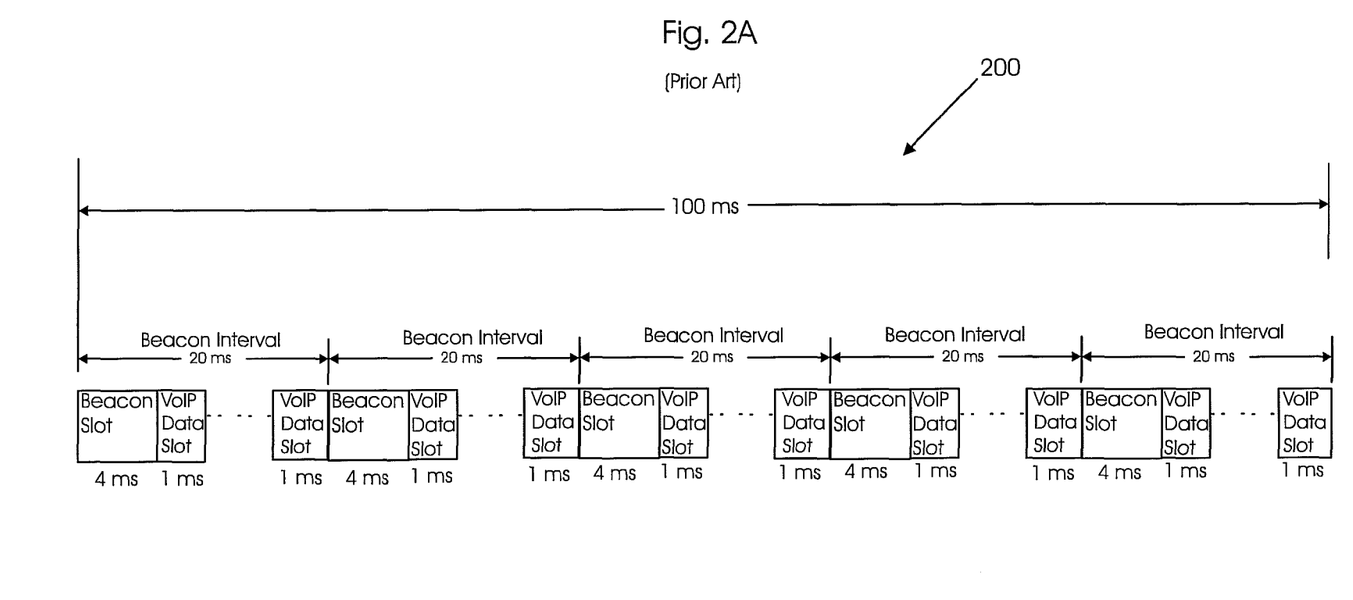
FIG. 2A shows a timing diagram of a schedule of service tasks.
Figure 2B:
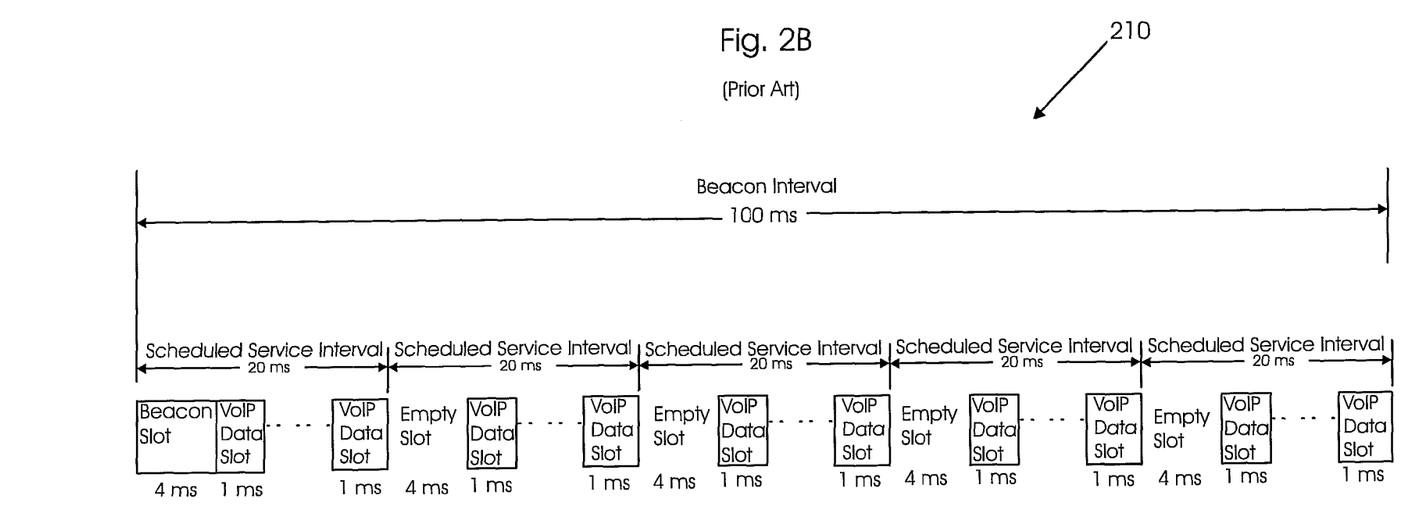
FIG. 2B shows a timing diagram of a schedule of service tasks.

FIG. 2A shows a timing diagram 200 of a schedule of service tasks. FIG. 2B shows a timing diagram 210 of a schedule of service tasks. FIG. 2A shows an example using a reduced beacon interval approach and FIG. 2B shows an example using the SSI (Scheduled Service Interval) approach. In both examples, a beacon slot is assumed to be four ms long and each data slot is assumed to be one ms long. All QoS data streams have the same service interval of twenty ms.

The beacon interval for the timing diagram 200 of FIG. 2A is twenty milliseconds. A scheduling system functioning in accordance with the timing diagram 200 of FIG. 2A, admits at most (beacon interval (20 ms)—beacon slot length (4 ms))/QoS data slot length (1 ms), or (20−4)/1=16, QoS data streams.

Figure 4:
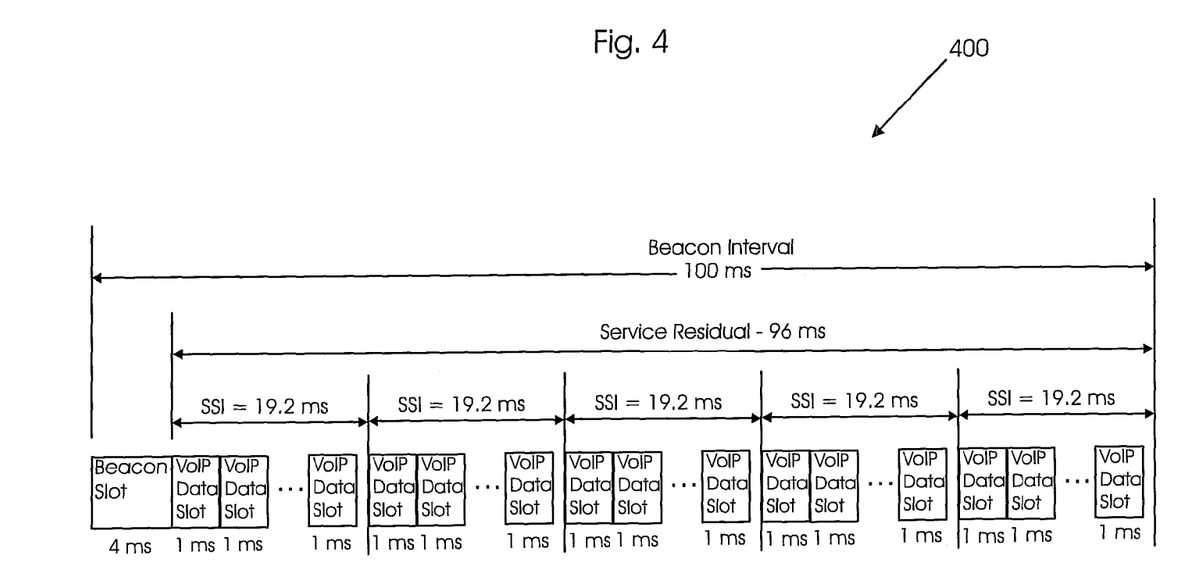
FIG. 4 shows a timing diagram of a schedule of service tasks in accordance with an embodiment of the present disclosed technology.

The beacon interval for the timing diagram 210 of FIG. 2B is one hundred milliseconds. A scheduling system functioning in accordance with the timing diagram 210 of FIG. 2B, can also admit sixteen QoS data streams, i.e. the same number of QoS data streams as for FIG. 2A. For FIG. 2B, the QoS data streams which can be admitted are calculated as (SSI (20 ms)—beacon slot length (4 ms)/QoS data slot length (1 ms)=16 QoS data streams. Compared to the schedule example shown by FIG. 2A, for FIG. 2B, among every five consecutive SSI's (Schedule Service Intervals), four of them have a four ms "Empty Slot" or empty time slot that is not occupied by scheduled QoS data or control messages (such as beacon messages). The four ms empty time slots shown in FIG. 2B can be used for transmitting best effort non-QoS data. FIG. 4 shows an exemplary schedule or timing diagram 400 produced using a method of an embodiment of the disclosed technology. In the exemplary schedule of FIG. 4, a beacon interval of one hundred ms, a beacon slot of four ms, and a VoIP data slot of one ms are used as is used for the technique shown in FIG. 2B. For the FIG. 4 example, in accordance with an embodiment of the disclosed technology, a control stream (for this example, the beacon signal or message) is scheduled along with a QoS data stream. The beacon signal, message, or stream includes a single stream with a service interval which is the beacon interval of one hundred ms. The QoS stream includes VoIP data streams having a service interval of twenty ms.

The duration of the schedule shown in diagram 400 of FIG. 4, is set to be the same as the longest service interval, which is one hundred ms. The schedule duration is first divided into two segments. The first segment is the beacon slot of four ms, and is for transmitting the beacon message stream. The second segment is the remaining part of the schedule duration, called the residual service interval and lasts for ninety-six ms. The residual service interval is the time duration that is remaining within the schedule duration after the stream(s) with the longest service interval, in this case, the beacon message stream, has been scheduled. The residual service interval is then divided into five schedulettes of equal length, each of them 19.2 ms in duration. The number of QoS VoIP data streams that the schedule shown by diagram 400 can accommodate is thus calculated as 19.2 ms (⅕ of the residual service interval time)/1 ms (VOIP data slot) equals approximately 19. Thus, the disclosed technology in the example of FIG. 4 can admit three more QoS VOIP data streams than the schedules shown by diagrams 200 and 210 in FIGS. 2A and 2B, respectively.

Figure 5:
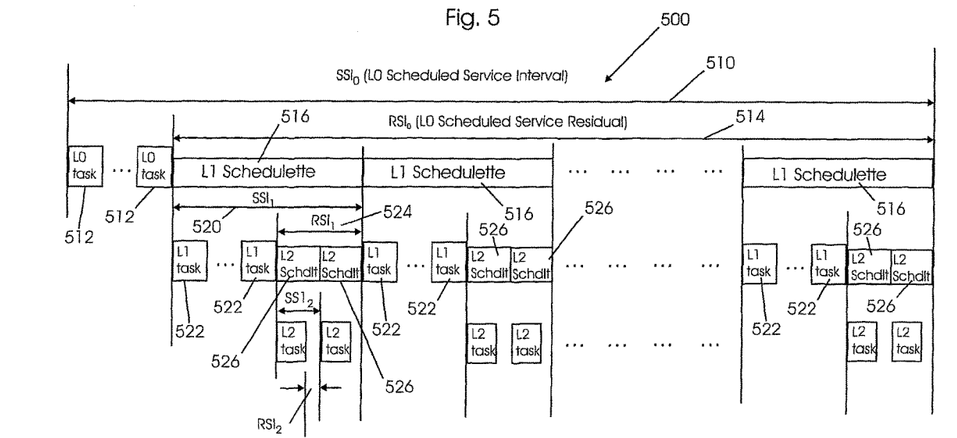
FIG. 5 shows a diagram which demonstrates a hierarchical and recursive procedure of how to construct a schedule in accordance with an embodiment of the present disclosed technology.
Figure 6:
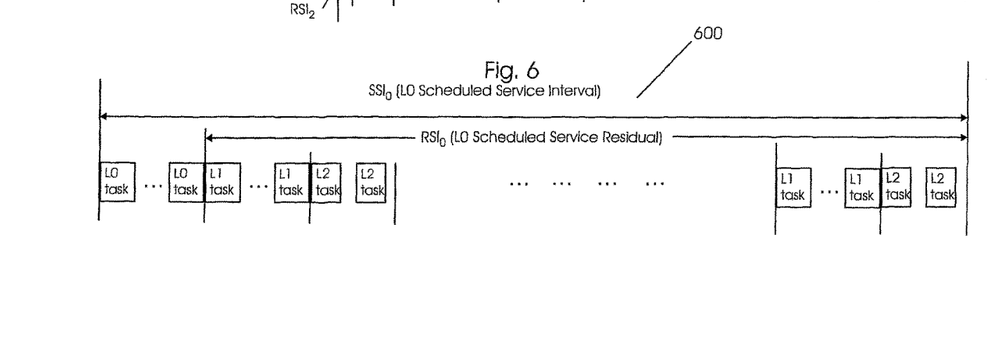
FIG. 6 shows a resultant schedule from the technique demonstrated by FIG. 5, with service tasks of all levels scheduled.

The method of the present disclosed technology as illustrated by the exemplary schedule or diagram 400 in FIG. 4, can be generalized to schedule QoS data streams of more than two different service intervals in a hierarchical fashion. This is illustrated by FIG. 5 and FIG. 6. FIGS. 5-6 show first and second diagrams 500 and 600, respectively, which demonstrate a hierarchical and recursive procedure of how to construct a schedule in accordance with an embodiment of the present disclosed technology.

In a method of an embodiment of the disclosed technology, the admitted QoS streams are firstly arranged into levels based on their service intervals. The streams with the longest service interval are level 0 streams. Correspondingly the service interval of level 0 streams is denoted as target service interval 0, or TSI.sub.0. In certain embodiments of the present disclosed technology, beacons or other control and/or management signals are effectively treated as QoS streams. In the example of FIGS. 5-6, beacons are treated as a QoS stream with a packet generation or service interval of the beacon interval, e.g. one hundred ms. The service interval of a beacon is very large compared to a service interval for typical VoIP data streams. Thus in certain embodiments of the disclosed technology, the beacon "stream" is a level 0 stream. Hence the level 0 target service interval and the level 0 scheduled service interval are both set to one hundred ms. The term "target service interval" (TSI) reflects the fact that this service interval is QoS stream's wished service interval, not the actual service interval provided by the schedule, which may or may not be the same. The actual service interval is termed "scheduled service interval" (SSI). The next level, level 1, includes streams with a target service interval that is a submultiple of $TSI_0$. In other words, $TSI_0=M_0*TSI_1$, where $M_0$ is the 0-th multiplier or the multiplier between level 0 and level 1. Further, $TSI_1=k_1*TSI_2$, ... $TSI_i=M_i*TSI_{i+1}$. For QoS streams with target service intervals that are different from the target service intervals of these levels, they are arranged into levels with target service intervals that are less than their own actual service intervals. Within the same level, the QoS streams are also ranked. The rank may be random, or based on importance of the stream, or other criteria the implementer may choose.

Generally, for any QoS stream, there is a range of acceptable service intervals. Normally the service interval of a QoS stream should be at least the same as the packet generation interval of the QoS stream. Anything lower than this bound, although it does not affect the QoS for this particular stream, reduces schedule efficiency because some service attempts will be inevitably be wasted for there is no packet waiting to be transmitted. The upper bound of an acceptable service interval is determined by the maximum packet latency the receiving application can tolerate. For instance the International Telecommunication Union (ITU) G.114 recommendation suggests that any VoIP packet taking more than 150 ms to arrive at the receiving end of the VoIP call from when the packet is generated at the called end will cause defects such as gaps and laggings that are noticeable by the speaking parties. In other words the receiving end of a VoIP call can tolerate at most 150 ms of packet latency. The maximum latency minus all other delays such as packet forwarding delay, processing delay, etc yields the maximum service interval for the QoS stream. Any service interval larger than the maximum service interval will result in some packets arriving at their destination with latencies exceeding the maximum tolerable latency and these packets being discarded. In one or more embodiments of the disclosed technology, the preferred target service interval is close to the lower bound instead of the upper bound.

Here in one or more embodiments of the disclosed technology, periodic control and management messages, i.e. beacon messages, are treated as if they belong to QoS streams of certain characteristics. Transmissions of non-periodic control and management messages can be planned in two ways. The first is simply to use unoccupied time slots in the schedule. The second is to create one or more artificial "streams", which essentially reserves periodic time slots not used by any other traffic streams. Non-periodic control and management messages can use these time slots.

FIG. 5 is a generalized illustration of the schedule construction method of an embodiment of the disclosed technology. At the top level, level 0, the scheduled service interval $SSI_0$, which is also marked as 510, is the same as target service interval, i.e. $SSI_0=TSI_0$. This is because the schedule is in its initial state before level 0 QoS stream service tasks are scheduled. Level 0 QoS streams data slots or L0 (Level 0) tasks 512 shown in FIG. 5, which may include a plurality of L0 tasks, are firstly inserted into the schedule 500. What is left in the L0 Scheduled Service Interval $SSI_0$ is called a residual service interval for level 0, or $RSI_0$, which is also identified as 514. $RSI_0$ is then divided into a number of equal length next level (L1) schedulettes 516. Exactly how many schedulettes a residual service interval will be divided into depends on the multiplier between the levels. For example, $RSI_0$ is divided into the same number of level 1 schedulettes as the multiplier between level 0 and level 1, which is "$M_0$". Each schedulette becomes a scheduled service interval for the next level. That is, $SSI_1 = RSI_0/M_0$.

In the schedule shown by FIG. 5, produced by a method of an embodiment of the present disclosed technology, it must be ensured that the schedule does not violate the maximum service intervals for all scheduled streams. That is, the time gap between any two consecutive scheduled service tasks for any stream does not exceed the maximum service interval of the same stream. The longest service gap between any two consecutive service tasks of a same stream is between two level 1 service tasks of the same stream, which happens between the last service task in a previous service duration and the first service task in a current service duration. The gap length is the length of the level 1 scheduled service interval plus the time serving all level 0 service tasks. The gap between any two consecutive service tasks of a stream of a higher level is shorter because the scheduled service intervals for higher level streams are only a portion of the level 1 scheduled service intervals. Although the exact service gaps for all streams can be calculated to make sure that the maximum service intervals are not violate, in an embodiment of the present technology, a simplified approach may be taken. That is, the worst case service gap is compared with the maximum service intervals of all streams, regardless of their levels. In other words, when scheduling level 0 service tasks, if the current total service time for level 0 tasks plus the service time for a new level 0 service task (to potentially be added to the schedule) and the duration of a level 1 schedulette exceeds the maximum service intervals for any QoS stream, the new level 0 service task should not be added to the schedule Mathematically, this condition is expressed as: $T_{0+\Delta}T_+(SSI_0 - _{T0}\Delta_T)/M_0 > MSI_i$ for all i's, where $T_0$ is the total service time for all already-scheduled level 0 service tasks; $\Delta T$ is the service time for the new level 0 service task; $SSI_0$ is the level 0 schedule service interval which is the same as the level target service interval and the service duration; $M_0$ is the multiplier between level 0 and level 1; and $MSI_i$ is the maximum service interval for QoS stream i. In practice, such a condition can often be avoided by choosing the target service intervals for QoS streams close to their minimum service intervals, or packet generation intervals.

The next level recursion of the method illustrated by FIG. 5 fills the service tasks for the level 1 schedulette. The duration of a level 1 schedulette or 516 in FIG. 5, is a level 1 scheduled service interval, or SSI.sub.1, also labeled as 520, which is shown in FIG. 5. The steps, similar for level 0 are repeated for level 1. Firstly level 1 service tasks 522 are scheduled. Then the unused portion of $SSI_1$ becomes $RSI_1$ also labeled as 524, which is shown in FIG. 5, and subdivided into $M_1$ level 2 schedulettes, each of which is marked as 526. $SSI_2$, which is the scheduled service interval for level 2, and $RSI_2$, the residual service interval of level 2 the unused portion of $SSI_2$, are also shown in FIG. 5.

In the example illustrated by FIG. 5, the multiplier between level 1 and level 2, $M_1$, is 2. Then the recursion continues. At level n with scheduled service interval being $SSI_n$, firstly level n service tasks are scheduled, then the unused portion of $SSI_n$ becomes $RSI_n$ and $RSI_n$ is divided into $M_n$ level n+1 schedulettes. The duration of each level i+1 schedulette is $RSI_n/M_n$, which also becomes $SSI_{n+1}$ and the recursion enters the level n+1. The recursion continues until either all admitted QoS streams are scheduled service, or the schedulette is too short to hold any service task. The resultant schedule with service tasks of all levels is illustrated by the diagram or schedule 600 shown in FIG. 6.

The schedule of service tasks can be dynamic. For example, the order of first level SI VoIP calls for the first level service tasks shown in FIG. 5, can be different for different cycles. For example, during a first one hundred ms service interval or cycle, a first level SI VoIP call transmission opportunity can be scheduled between the AP 104 and the member station 106 during a first 1 ms slot, and next a first level SI VoIP call transmission opportunity can be scheduled between the AP 104 and the member station STA 2 108. During a subsequent one hundred ms service interval or cycle, the first level SI VoIP call between the AP 104 and the STA 2 108 may be slotted for transmission opportunity before the first level SI VoIP call between the AP 104 and the STA1 106. Service tasks of the same level can be changed in the schedule from one cycle to the next by random shuffling or by rotation. The shuffling may occur every k schedule duration intervals where k is greater than or equal to 1, I.e., in the previous example, the shuffling or rotation may be done by the Access Point 104 every one hundred milliseconds. For the rotation method, if service tasks are executed in an order of #1 through #n in a first cycle, they could be executed in an order of #2 through #n and then #1 in a subsequent cycle. In subsequent cycles the service tasks could continue to be rotated, so that each service task rotates through each position in the schedule.

The scheduling delay for each service task of a particular level, such as level 1, is recorded by the Access Point 104 in computer memory and the position of the particular service task or traffic flow can be moved in the schedule based on delay records. Such delay data can be used in many ways. As one example, a historic scheduling delay data for a particular flow can be summarized into a distribution, e.g. a Gaussian distribution and stored in computer memory of the Access Point (AP) 104. The Access Point (AP) 104 can then build a schedule with respect to certain system scheduling delay goals, e.g. minimizing the total average scheduling delays for all traffic flows.

Figure 3:
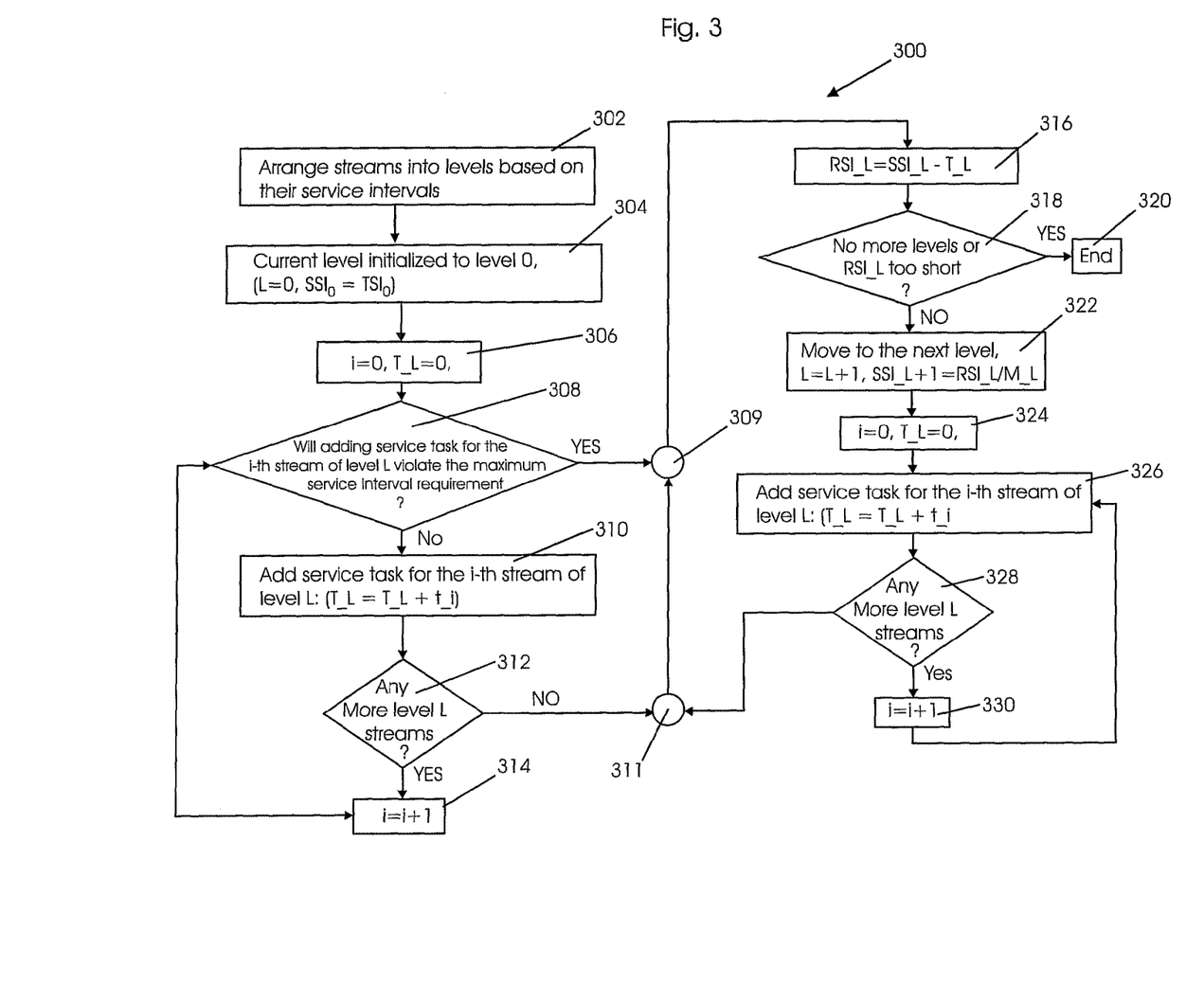
FIG. 3 is a flow chart of a method in accordance with an embodiment of the present disclosed technology.
Figure 7:
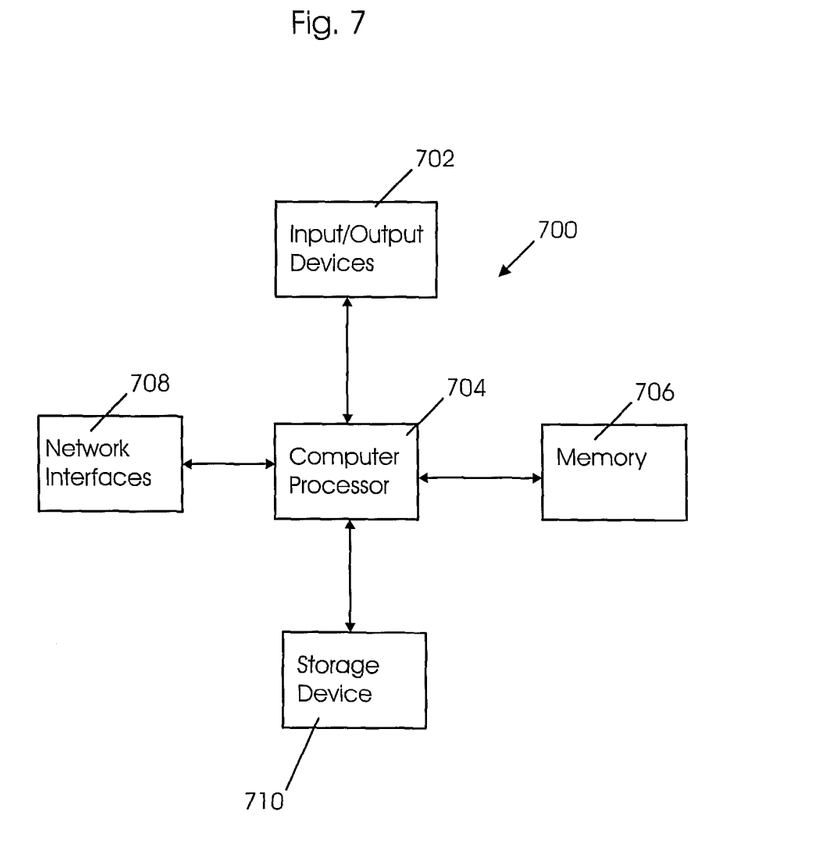
FIG. 7 shows a high level block diagram of a computer.

FIG. 3 shows a flow chart 300 of a method in accordance with an embodiment of the disclosed technology. The method of FIG. 3 may be executed by the Access Point (AP) 104. The Access Point (AP) 104 may be a computer, such as a computer 700, having a computer processor 704, as shown in FIG. 7. At step 302 in FIG. 3, all QoS streams (including control streams such as beacons which are treated as QoS streams) are arranged into levels based on their service intervals. Level 0 contains QoS streams with the longest service interval. The next level down (level 1) contains QoS streams with a service interval that is a sub multiple of the service interval of level 0. The next level down (level 2) contains QoS streams with a service interval that is a sub multiple of the service interval of level 1, and so on for however many levels there are.

The scheduling process shown by FIG. 3 begins by scheduling service tasks for level 0 streams and getting ready to schedule the first (the 0-th) stream of the current level. At level 0, the scheduled service interval SSI is the same as the target service interval, TSI, of the level streams. At step 304 the current level is initialized to level 0, i.e. L=0, $SSI_0=TSI_0$. At step 306, the parameters i, for the i-th stream of the current level L, and T_L, for a total service time for current level streams, are set to zero. These parameters and any other parameters may be set in memory 706 by computer processor 704. At step 308, the computer processor 704 determines whether adding this current service task for the i-th stream of level 0 will violate the maximum service interval requirement. If no, then the service task is added to the schedule at step 310, and the total service time for this level, T_L, is increased by the service time for a service task of this current i-th stream, t_i.

The processor 704 next checks at step 312 if there are any more QoS streams in the current level that have not been scheduled. If so, the processor 704 gets ready to schedule a service task for an unscheduled stream by incrementing the variable i at step 314 and the process loops back to step 308 for the next stream. If there are no more unscheduled streams in the current level, the process continues by getting ready to move to the next level down at step 316. At step 316 of FIG. 3, the computer processor 704 calculates the residual service interval for the current level, RSI_L, which is scheduled service interval of the current level, SSI_L, minus the total service time for all service tasks scheduled for streams of the current level, T_L.

If the processor 704 determines at step 308 that adding the current service task will violate the maximum service level requirement, the processor 704 stops adding service tasks for any more level 0 streams and goes to step 316 for getting ready for the next level.

The processor 704 verifies at step 318 if there are any more levels or if the residual service interval for the current level, RSI_L, is too short to schedule and service tasks. If so, the process stops at step 320 and the schedule is completed. Otherwise the process moves to the next level lower at step 322. The scheduled service interval for the next lower level is calculated by dividing the residual service interval, RSI, of the next level higher by the multiplier between the two levels, M_L. And the new level becomes the current level. Step 324 gets ready to schedule service tasks for QoS streams of the current level by initializing the total service time for the current level, T_L, equal to zero, and selecting the first stream of that level by setting i=0 (for the 0-th stream) of the current level. The processor 704 at step 326 adds a service task for the selected stream and updates the total service time for the current level, T_L by adding the service time of the i-th stream or task, t_i. The processor at step 328 loops the process back to step 326 via step 330 which selects a next stream (by incrementing i) of the current level, if there are more streams in the current level that have not been scheduled service tasks for. Otherwise, the processor at step 328 directs the process back to step 316 to add service tasks for the next level via node 309.

A high-level block diagram of a computer 700 is illustrated in FIG. 7. The access point 104, or any of the member stations 106, 108, 110, and 112, may be a computer similar to or identical to the computer 700. Computer 700 contains a processor 704, which controls the overall operation of the computer 700 by executing computer program instructions, which define such operation. The computer program instructions may be stored in a storage device 710 or other computer readable medium (e.g., magnetic disk, CD ROM, etc.), and loaded into a memory 706 when execution of the computer program instructions is desired. Thus, the method steps of FIG. 2 can be defined by the computer program instructions stored in the memory 706 and/or storage device 710 and controlled by the processor 704 executing the computer program instructions. For example, the computer program instructions can be implemented as computer executable code programmed by one skilled in the art to perform an algorithm defined by the method steps of FIG. 2. Accordingly, by executing the computer program instructions, the processor 704 executes an algorithm defined by the method steps of FIG. 2. The computer 700 also includes one or more network interfaces 708 for communicating with other devices via a network. The computer 700 also includes input/output devices 702 that enable user interaction with the computer 700 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method, comprising:
   scheduling, by a processing system including a processor, service tasks for control traffic flow and for data traffic flow, wherein the scheduling is for a plurality of cycles, wherein the control traffic flow comprises a beacon signal in a beginning cycle portion of each cycle; and
   arranging, by the processing system, the service tasks according to levels of a hierarchy based on a length of service task interval,
   wherein the scheduling of the service tasks for each cycle of the series of cycles comprises:
      scheduling first service tasks from a first hierarchical level for transmission during a first service interval, wherein the first service tasks are scheduled in a series at a beginning interval portion of the first service interval; and
      scheduling second service tasks from a second hierarchical level for transmission during a plurality of second service intervals that commences within a residual portion of the first service interval, each of the first service tasks having a longer service task interval than each of the second service tasks,
   wherein the series of first service tasks in a first cycle of the plurality of cycles is different from that of a second cycle of the plurality of cycles, the first service tasks accordingly being executed in a different order in the first cycle and in the second cycle.

2. The method of claim 1, wherein the series of first service tasks in the first cycle differs from that of the second cycle according to a shuffling procedure.

3. The method of claim 2, wherein the shuffling procedure is performed every k cycles, k being greater than or equal to 1.

4. The method of claim 1, wherein the series of first service tasks in the first cycle differs from that of the second cycle according to a predetermined rotation procedure.

5. The method of claim 1, wherein at least a portion of the first service tasks of the first hierarchical level and the second service tasks of the second hierarchical level are associated with quality of service types.

6. The method of claim 1, wherein the data traffic flow comprises data calls.

7. The method of claim 1, wherein the control traffic flow comprises service tasks for a communications channel in a wireless local area network.

8. The method of claim 7, wherein the beacon signal is transmitted from an access point of the wireless local area network.

9. The method of claim 1, further comprising:
recording, by the processing system, a scheduling delay for each of the service tasks, thereby generating delay data; and
altering, by the processing system, the scheduling of the service tasks based on the delay data.

10. The method of claim 9, wherein the scheduling of the service tasks is altered to meet a system delay goal.

11. A device comprising:
a processing system including a processor; and
a memory that stores executable instructions that, when executed by the processing system, facilitate performance of operations, comprising:
scheduling service tasks for control traffic flow and for data traffic flow, wherein the scheduling is for a plurality of cycles, wherein the control traffic flow comprises a beacon signal in a beginning cycle portion of each cycle, wherein the data traffic flow comprises data calls; and
arranging the service tasks according to levels of a hierarchy based on a length of service task interval,
wherein the scheduling of the service tasks for each cycle of the series of cycles comprises:
scheduling first service tasks from a first hierarchical level for transmission during a first service interval, wherein the first service tasks are scheduled in a series at a beginning interval portion of the first service interval; and
scheduling second service tasks from a second hierarchical level for transmission during a plurality of second service intervals that commences within a residual portion of the first service interval, each of the first service tasks having a longer service task interval than each of the second service tasks,
wherein the series of first service tasks in a first cycle of the plurality of cycles is different from that of a subsequent second cycle of the plurality of cycles, the first service tasks accordingly being executed in a different order in the first cycle and in the second cycle, and
wherein at least a portion of the first service tasks of the first hierarchical level and the second service tasks of the second hierarchical level are associated with quality of service types.

12. The device of claim 11, wherein the series of first service tasks in the first cycle differs from that of the second cycle according to a shuffling procedure or a predetermined rotation procedure.

13. The device of claim 11, wherein the control traffic flow comprises service tasks for a communications channel in a wireless local area network.

14. The device of claim 13, wherein the beacon signal is transmitted from an access point of the wireless local area network.

15. The device of claim 11, wherein the operations further comprise:
recording a scheduling delay for each of the service tasks, thereby generating delay data; and
altering the scheduling of the service tasks based on the delay data.

16. A non-transitory machine-readable storage medium, comprising executable instructions that, when executed by a processing system including a processor, facilitate performance of operations, comprising:
scheduling service tasks for control traffic flow and for data traffic flow, wherein the scheduling is for a plurality of cycles, wherein the control traffic flow comprises a beacon signal in a beginning cycle portion of each cycle, wherein the beacon signal is transmitted from an access point; and
arranging the service tasks according to levels of a hierarchy based on a length of service task interval,
wherein the scheduling of the service tasks for each cycle of the series of cycles comprises:
scheduling first service tasks from a first hierarchical level for transmission during a first service interval, wherein the first service tasks are scheduled in a series at a beginning interval portion of the first service interval; and
scheduling second service tasks from a second hierarchical level for transmission during a plurality of second service intervals that commences within a residual portion of the first service interval, each of the first service tasks having a longer service task interval than each of the second service tasks,
wherein the series of first service tasks in a first cycle of the plurality of cycles is different from that of a subsequent second cycle of the plurality of cycles, the first service tasks accordingly being executed in a different order in the first cycle and in the second cycle.

17. The non-transitory machine-readable storage medium of claim 16, wherein the series of first service tasks in the first cycle differs from that of the second cycle according to a shuffling procedure or a predetermined rotation procedure.

18. The non-transitory machine-readable storage medium of claim 16, wherein at least a portion of the first service tasks of the first hierarchical level and the second service tasks of the second hierarchical level are associated with quality of service types.

19. The non-transitory machine-readable storage medium of claim 16, wherein the control traffic flow comprises service tasks for a communications channel in a wireless local area network that includes the access point.

20. The non-transitory machine-readable storage medium of claim 16, wherein the operations further comprise:
recording a scheduling delay for each of the service tasks, thereby generating delay data; and
altering the scheduling of the service tasks based on the delay data.

* * * * *